United States Patent Office 3,300,693
Patented Jan. 24, 1967

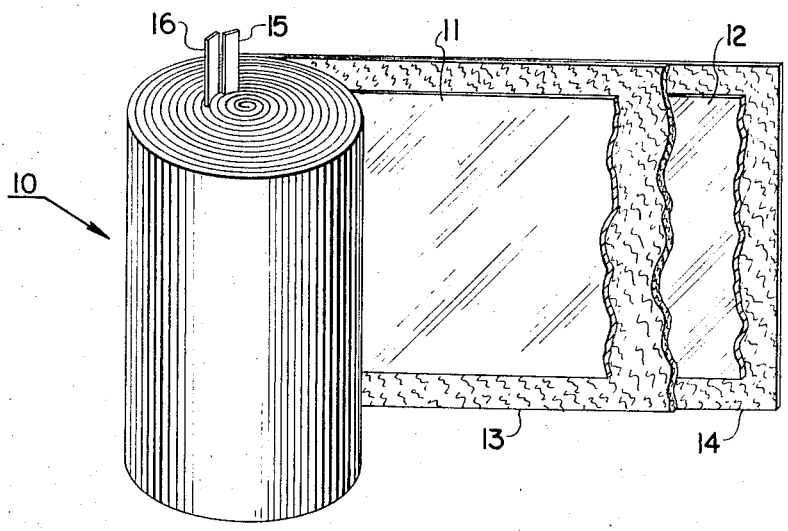

3,300,693
CAPACITOR WITH LOW RESISTIVITY ELECTROLYTE AND HIGH VOLTAGE RANGE
Sidney D. Ross, Williamstown, and Rene E. Cote, Worcester, Mass., assignors to Sprague Electric Company, North Adams, Mass., a corporation of Massachusetts
Filed June 28, 1966, Ser. No. 561,115
5 Claims. (Cl. 317—230)

This application is a continuation-in-part of our U.S. patent application Serial No. 218,126, filed August 20, 1962, now abandoned.

This invention relates to electrolytic capacitors, and more particularly to an electrolyte for such capacitors.

Sulfuric acid is widely used as the working electrolyte in tantalum capacitors. Though this is an excellent electrolyte for tantalum the use thereof presents many difficulties. Equipment and materials must be employed which can withstand the corrosive effects of the acid. Moreover, the sealing means must also be able to resist the acid. If the seal should fail, the acid will creep out of the capacitor and eventually cause breakdown of the unit. The escaping acid is also free to damage adjacent components and constitutes a hazard to anyone contacting it.

Aqueous electrolytes, such as a solution of ammonium pentaborate, are avoided because the primary solvent, water, limits the effective operating temperature range.

In U.S. Pat. 2,934,682 issued to Meyer Schwarz et al. there is described an electrolyte comprising a solute of an alkyl ammonium salt of a partially esterified phosphorus containing acid. While this electrolyte avoids the disadvantages of the prior art compositions, continued investigation reveals that it is not the final word in electrolytes.

Metals used in the manufacture of electrolytic capacitors are known as valve metals and they are formed with an oxide layer by electrolytic oxidation in the electrolyte. This formation involves an electrolytic oxidation by a current through an electrolytic cell in which the valve metal is the anode. The voltage is applied across the cell and is increased with time to maintain the current density constant as the oxidation of the valve metal progresses. In the electrolytic oxidation the formation of the oxide film results in a condition under which the voltage across the cell needs to be increased with time to maintain the current density constant. The highest potential which may be impressed across the cell under these conditions is referred to as the maximum formation voltage. At voltages above this point scintillation or sparking occurs. This defines an extremely important parameter since a capacitor must be operated at a voltage below the scintillation voltage of the electrolyte. Operating above the scintillation voltage will result in a direct short. The art is constantly striving for electrolytes which will permit continued operation under adverse conditions.

It is therefore an object of the instant invention to present an electrolytic capacitor employing an electrolyte having an extremely high scintillation voltage which permits higher voltage ratings.

A still further object is to present a capacitor employing an electrolyte having an extremely high scintillation voltage and an unexpectedly low resistivity.

It is another object to present an electrolytic capacitor employing a non-aqueous electrolyte efficient over a wide temperature range.

It is a further object of this invention to fabricate an aluminum or tantalum electrolytic capacitor, the electrolyte of which may be the same as the forming electrolyte.

Further objects of this invention, as well as the advantages, will be apparent from the specification when considered in relation to the accompanying drawing of which:

The sole figure shows an isometric view of a partially unwound capacitor of the present invention.

Briefly, the foregoing objects were attained in accordance with the invention by incorporating in a capacitor comprising electrodes, at least one of which is oxide coated, an electrolyte resulting from the combination of (1) at least one compound of the group consisting of

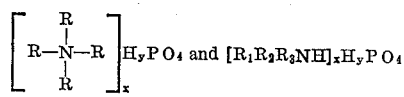

wherein:

R is a member of the group consisting of a $C_1$–$C_{10}$ alkyl group, a $C_2$–$C_{10}$ hydroxy substituted alkyl group, an aromatic group and combinations thereof;

$R_1$ is a member of the group consisting of a $C_1$–$C_{10}$ alkyl group and a $C_2$–$C_{10}$ hydroxy substituted alkyl group;

$R_2$ and $R_3$ are members of the group consisting of a $C_1$–$C_{10}$ alkyl group, a $C_2$–$C_{10}$ hydroxy substituted alkyl group, hydrogen and combinations thereof;

$x=1$–$3$
$y=0$–$2$ and (2) orthophosphoric acid, both dissolved in a liquid amide solvent.

The quaternary ammonium salts included within the above general formula are formed by the reaction of phosphoric acid with an appropriate quaternary ammonium hydroxide. Representative hydroxides are tetramethylammonium hydroxide, dimethyldiethylammonium hydroxide, tetraphenylammonium hydroxide, triethylfluorenylammonium hydroxide, benzyltriethylammonium hydroxide, benzyltrimethylammonium, tetraethylammonium, etc. hydroxides.

The amine salts included within the above general formula are formed by the reaction of phosphoric acid with the appropriate amine. The amines contemplated have the following general formula $R_1R_2R_3N$ wherein $R_1$, $R_2$ and $R_3$ are defined as above. Representative amines are mono, di and trimethylamine, the ethyl, hydroxyethyl, propyl, hydroxypropyl, etc. homologs and analogs thereof and mixed alkyl or alkanol amines such as methylethyl-i-propylamine. The preferred amine is triethylamine.

It is to be understood that a mixture of a quaternary ammonium phosphate salt and an amine phosphate salt can be employed in forming the subject electrolyte.

The liquid amide solvent is represented by the general formula $R_4CONR_5R_6$ wherein:

$R_4$ is a member of the group consisting of hydrogen and organic radical
$R_5=$ alkyl
$R_6$ is a member of the group consisting of hydrogen and an alkyl group.

Examples of suitable amides are N-ethylformamide, N-ethylacetamide, N-methylpropionamide, N,N-dimethylformamide, N,N-diethylformamide, N,N-dimethylacetamide, etc.

In solution in the amide solvent the (1) phosphate salt and (2) the orthophosphoric acid is represented by the equilibrium mixture of the species resulting from the ions $H^+$, $PO_4^\equiv$ and at least one member of the group consisting of

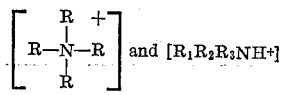

wherein:

R, $R_1$, $R_2$ and $R_3$ have the same meaning as in the definition of the phosphate salt (1) above.

The capacitor electrodes contemplated herein may be either tantalum or aluminum.

Reference is made to the drawing in which 10 represents a capacitor partially unwound. The anode 11 consists of tantalum or aluminum having a corresponding oxide film formed on the surface thereof. The cathode 12 is usually a valve metal but for direct current applications may be of silver. The anode and/or cathode may be etched, perforated, sprayed or otherwise modified before formation to increase the effective surface area thereof. Porous spacers 13 and 14 may be of glass cloth, cellulose paper, perforated polytetrafluoroethylene or other material inert in the electro-chemical system of the present invention. Tabs 15 and 16 are connected to the two electrode foils for termination purposes. The housing for the capacitor may be a metal or nonmetal container such as aluminum, silver and glass respectively.

The following example is illustrative of a preferred electrolyte and the use thereof in a capacitor.

EXAMPLE

One mole of phosphoric acid is reacted with three moles of triethylamine in isopropyl alcohol. The resulting tris-triethylammonium phosphate

$$[(C_2H_5)_3NH^+]_3PO_4\equiv$$

is filtered, recrystallized from isopropyl alcohol and dried. To 100 ml. of dimethylformamide is added 0.1 gram of this salt. To this is added 0.5 ml. of phosphoric acid (86%). This electrolyte was impregnated into a tantalum foil capacitor of the type comprising, a rolled capacitor section sealed in an aluminum case with solderable nickel wire leads.

Beaker determinations on this electrolyte have shown it to have a scintillation voltage in excess of 500 volts and the slope of its build curve to be approximately 60 volts/minute. By way of comparison of polyphosphate-dimethylformamide electrolyte, of the type disclosed in U.S. Patent 2,934,682, scintillated at 350 volts and had a build curve of approximately 40 volts/minute. All determinations were made at 90° C.

For purposes of further comparison several electrolytes were prepared and tested under identical conditions. The first series of electrolytes consisted of varying proportions of phosphoric acid in dimethylformamide. The second series consisted of varying proportions of tris-triethylammonium phosphate in dimethylformamide. The third series consists of varying proportions of phosphoric acid with 0.1 gram (about the maximum limit of solubility) of tris-triethylammonium phosphate. The results are tabulated below.

Table I
[$H_3PO_4$ in dimethylformamide]

| Concentration, ml./100 cc. | Resistivity-ohm-cm., 90° C. | Scintillation Voltage |
|---|---|---|
| .25 | 78,862 | 489 |
| .50 | 28,595 | 502 |
| .75 | 10,535 | 505 |
| 1.0 | 6,622 | 504 |
| 1.5 | 3,251 | 504 |

Table II
[Tris-triethylammonium phosphate in dimethylformamide]

| Gms./100 cc. | Resistivity-ohm-cm., 90° C. | Scintillation Voltage |
|---|---|---|
| .03 | 31,003 | 511 |
| .07 | 16,555 | 507 |
| .1 | 13,334 | 502 |

Table III
[$H_3PO_4$ and 0.1 gms. tris-triethylammonium phosphate in dimethylformamide]

| Concentration of Acid-ml./100 cc. | Resistivity-ohm-cm., 90° C. | Scintillation Voltage |
|---|---|---|
| .25 | 4,816 | 511 |
| .50 | 3,522 | 514 |
| .75 | 3,010 | 513 |
| 1.0 | 2,168 | 486 |
| 1.5 | 1,716 | 497 |

Table III shows that the scintillation voltage of the electrolyte of representative examples of the present invention is in the order of above 500 volts. This high scintillation voltage is obtained with an unexpected decrease in resistivity over that of phosphoric acid alone or the tris-triethylammonium phosphate alone in dimethylformamide. It will be noted that the resistivity of the phosphoric acid at 0.5 ml. is 28,595 ohm-cm. and that of the salt alone at 0.1 gram is 13,334 ohm-cm. whereas the combination of phosphoric acid and salt is about 3500 ohm-cm. While some decrease to an absolute minimum of about 9100 would be expected upon combination of the two single solute electrolytes, the decrease to about 3500 was unpredictable and unexpected. Thus, the formulation of a high scintillation voltage electrolyte i.e. above 350 volts, having a resistivity less than about 9000 ohm-cm. is a significant advance in the art.

The decrease in resistivity results in a lower dissipation factor in capacitors employing this electrolyte, especially at lower temperatures.

The solute concentrations in the solvent, in accordance with the present invention, can vary from about 0.01% by weight to the maximum limit of solubility for the salt (which is the reaction product of orthophosphoric acid and the quaternary ammonium hydroxide or the amine) and 0.01% to 10% by weight for the orthophosphoric acid. A preferred range is from 0.1–0.5 gram of salt and 0.1–1.5 ml. of orthophosphoric acid per 100 ml. of amide solvent.

It has been observed that the electrolyte within the scope of the instant invention having the best over-all characteristics is one containing a small percentage of water. The optimum amount falls within the range of about 0.01% to about 3.0% by weight of the composition. The water is conveniently introduced into the composition with the phosphoric acid. The upper limit of 3.0% is not an absolute maximum since within proper temperature limits an operable electrolyte still results though more than this amount be present. The limit of 3.0% was dictated by the need for an electrolyte stable at both low and high temperatures. Thus, at high temperatures there is little danger of a change in composition due to vaporization of the water when 3.0% is the maximum. There is also little danger at temperatures below freezing of a change in the characteristics of the electrolyte due to crystallization of the water when 3.0% is the maximum. On the other hand, although an anhydrous composition is operable no significant advantage warrants the trouble and expense required to obtain such a system. It should be obvious that the term "non-aqueous" as used herein has the well-known prior art meaning that relatively little water is present in the electrolyte.

Electrolytic capacitors produced in accordance with this invention are particularly advantageous when it is desired to operate the unit over a temperature range of about —55° C. to about 125° C. without suffering appreciable change in capacitance over the range or without exhibiting excessive loss, particularly at the low temperature end of the range. Capacitors impregnated with the subject electrolyte have shown better than 90% capacitance retention at —55° C.

The invention is not to be limited to the specific embodiments disclosed herein since many apparently widely different embodiments may be made without departing from the spirit and scope hereof. Accordingly, it is intended that the invention be limited only by the scope of the claims.

What is claimed is:
1. An electrolytic capacitor comprising electrodes, at least one of which is oxide coated and the electrolyte consisting essentially of the combination of (1) from about 0.01% by weight up to the maximum limit of solubility of at least one compound of the group consisting of

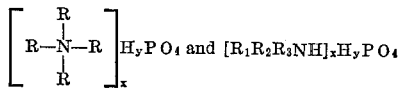

wherein:
R is a member of the group consisting of a $C_1$–$C_{10}$ alkyl group, a $C_2$–$C_{10}$ hydroxy substituted alkyl group, and combinations thereof;
$R_1$ is a member of the group consisting of a $C_1$–$C_{10}$ alkyl group and a $C_2$–$C_{10}$ hydroxy substituted alkyl group;
$R_2$ and $R_3$ are members of the group consisting of a $C_1$–$C_{10}$ alkyl group, a $C_2$–$C_{10}$ hydroxy substituted alkyl group, hydrogen and combinations thereof;
$x=1$–$3$
$y=0$–$2$
and (2) from about 0.01% to about 10% by weight orthophosphoric acid both dissolved in a liquid amide solvent represented by the general formula $R_4CONR_5R_6$ wherein:
$R_4$ and $R_6$ are members of the group consisting of hydrogen and an alkyl radical and $R_5$ is an alkyl radical; said combination of (1) and (2) providing ionic means for maintaining the resistivity of the electrolyte below about 9000 ohm-cm. while permitting operating voltages above about 350 volts.

2. The electrolytic capacitor of claim 1 wherein (1) is tris-triethylammonium phosphate and the amide solvent is N,N-dimethylformamide.

3. The electrolytic capacitor of claim 1 wherein the electrolyte contains from about 0.01% to about 3.0% water.

4. The electrolytic capacitor of claim 1 wherein the electrolyte consists essentially of 0.1 gram of tris-triethylammonium phosphate and 0.5 ml. of 86% orthophosphoric acid dissolved in each 100 ml. of N,N-dimethylformamide.

5. The electrolytic capacitor of claim 4 having a pair of tantalum foils convolutely wound with spacer material and at least one of said foils being oxide coated.

References Cited by the Applicant

UNITED STATES PATENTS

| | | |
|---|---|---|
| 1,988,202 | 4/1935 | Robinson. |
| 2,934,682 | 7/1956 | Schwarz et al. |
| 2,965,816 | 12/1960 | Ross. |
| 3,067,367 | 12/1962 | Ross. |

JOHN W. HUCKERT, *Primary Examiner.*

D. J. KALLAM, *Assistant Examiner.*